(12) United States Patent
Iida (10) Patent No.: US 8,520,328 B2
(45) Date of Patent: Aug. 27, 2013

(54) LENS BARREL AND IMAGING APPARATUS

(75) Inventor: Seiji Iida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/010,288

(22) Filed: Jan. 20, 2011

(65) Prior Publication Data

US 2011/0194198 A1  Aug. 11, 2011

(30) Foreign Application Priority Data

Feb. 5, 2010 (JP) ................................. 2010-024664
Feb. 5, 2010 (JP) ................................. 2010-024665

(51) Int. Cl.
*G02B 7/02* (2006.01)

(52) U.S. Cl.
USPC ........................................................ 359/819

(58) Field of Classification Search
USPC .................................. 359/819–830
See application file for complete search history.

(56) References Cited

U.S. PATENT DOCUMENTS

| 5,721,645 | A  | * | 2/1998 | Iwasaki et al. ................ | 359/823 |
| 7,515,195 | B2 |   | 4/2009 | Endo et al. | |
| 7,936,985 | B2 | * | 5/2011 | Kudoh ............................. | 396/89 |
| 2004/0207746 | A1 |   | 10/2004 | Endo et al. | |
| 2005/0052759 | A1 | * | 3/2005 | Ito et al. ......................... | 359/819 |
| 2007/0171554 | A1 | * | 7/2007 | Yoshii et al. ................... | 359/819 |
| 2009/0231736 | A1 | * | 9/2009 | Kudoh .......................... | 359/823 |

FOREIGN PATENT DOCUMENTS

| CN | 1627117 A | 6/2005 |
| CN | 101379689 A | 3/2009 |
| CN | 101571623 A | 11/2009 |
| JP | 2002-107602 A | 4/2002 |
| JP | 2004-317943 | 11/2004 |
| JP | 2007-219304 | 8/2007 |

OTHER PUBLICATIONS

The above references were cited in a Apr. 1, 2013 Chinese Office Action, a copy of which is enclosed with an English Translation, that issued in Chinese Patent Application No. 201110034764.9.

* cited by examiner

*Primary Examiner* — Scott J Sugarman
*Assistant Examiner* — Vipin Patel
(74) *Attorney, Agent, or Firm* — Cowan, Liebowitz & Latman, P.C.

(57) ABSTRACT

For a lens barrel that restricts the rectilinear of a lens group using a restricting portion such as a rectilinear key, the light-shielding property for external light, the degree of freedom of design relating to the arrangement of the interlocking section for a cam ring, as well as a change in the relative distance between a front group and a rear group are increased. A lens barrel has a first group (front group) 101 and a second group (rear group) 102 that are movable in the optical axis direction. The first group cam ring 124 is cam-engaged with and held by the holding member (the first group barrel 111) of the first group 101, and the second group cam ring 126 is cam-engaged with and held by the holding member (the second group barrel 112) of the second group 102. The moving cam ring 123 guides the first group cam ring 124 and the second group cam ring 126, and the fixed tube 122 is cam-engaged with the moving cam ring 123 to thereby rotatably support it. The front group and the rear group are cam-engaged with and held by different cam rings. The front group and the rear group are held and guided by the moving cam ring 123.

8 Claims, 7 Drawing Sheets

(A) FIRST GROUP TRAJECTORY  (B) SECOND GROUP TRAJECTORY

LENS BARREL AND IMAGING APPARATUS

BACKGROUND OF THE INVENTION

1. Field of the Invention

The present invention relates to a technique for improving the light-shielding property, the degree of freedom of design, and the operation accuracy of a lens barrel for use in an imaging apparatus such as a digital camera.

Furthermore, the present invention relates to a technique for increasing the movement stroke of a lens group in a retracted state, for a lens barrel for use in an imaging apparatus such as a digital camera, while keeping the lens barrel thin.

2. Description of the Related Art

For a lens barrel, a configuration in which a front group and a rear group of a lens group barrel are cam-engaged and held so as to restrict the rotation of the front group and the rear group using a guide member having a key for rectilinear restriction is known. Japanese Patent Laid-Open No. 2007-219304 discloses a shooting barrel in which the outer periphery portion, which is positioned outside a rectilinear key in the radial direction, of a cam ring that relatively rotates adjacent to the rectilinear key is cut out.

In addition, as the shooting performance and portability of imaging apparatuses are improved, thinning of a retractable lens barrel is desired. Conventionally, a three-stage retractable lens barrel in which a front group and a rear group of lens barrel are cam-engaged with and held by a third-stage cam member is known. Japanese Patent Laid-Open No. 2004-317943 discloses a digital camera that has been thinned by retracting a part of a shooting lens to a preferable position during retraction.

A conventional lens barrel has a poor light-shielding property for external light, and a low degree of freedom of design in the arrangement of the interlocking section for a cam ring. In the configuration disclosed in Japanese Patent Laid-Open No. 2007-219304, the outer peripheral portion of the cam ring is cut out. Hence, when external light that is penetrated into the lens barrel has passed through the outer periphery of the cam ring to reach the imaging element, there is a possibility that such light may affect a shot image. Additionally, the arrangement of the interlocking section, which moves in association with adjacent members, of the cam ring is limited, resulting in a reduction in the degree of freedom of design.

Also, in the conventional configuration, the relative distance between the front group and the rear group is limited by the amount of movement by the cam groove of the front group and the cam groove of the rear group, which are arranged on the third-stage cam member. Therefore, it is difficult to balance reducing the length of the lens barrel in the optical axis direction in a retracted state as much as possible and obtaining a large change in the relative distance during lens driving.

Accordingly, the present invention provides a lens barrel that improves light-shielding property for external light and the degree of freedom of design relating to the arrangement of the interlocking section for the cam ring.

Furthermore, according to the present invention, a change in the relative distance between the front group and the rear group is increased in a thin-type retractable lens barrel.

SUMMARY OF THE INVENTION

In view of the foregoing, according to an aspect of the present invention, a lens barrel including a first lens group and a second lens group that are movable in an optical axis direction is provided that includes a first cam member that is cam-engaged with a holding member of the first lens group to thereby hold the holding member; a first restricting member that restricts the rotation of the holding member of the first lens group; a second cam member that is cam-engaged with a holding member of the second lens group to thereby hold the holding member; a third cam member that guides the first and the second cam members; and a rectilinear guide member that is integrally movable with the third cam member in the optical axis direction and has a restricting portion that restricts the rotation of the first restricting member; wherein a flange portion, which extends in a direction perpendicular to the optical axis of the lens group over the inner peripheral surface of the third cam member, is formed on the first cam member or the first restricting member, and the restricting portion extends through the flange portion.

With this arrangement, the light-shielding property of the interior of the lens barrel against external light penetrating into the lens barrel becomes high, and the degree of freedom of design relating to the arrangement of the interlocking section for the cam ring can be improved.

In view of the foregoing, according to another aspect of the present invention, a lens barrel including a first lens group and a second lens group that are movable in an optical axis direction and a driving mechanism of the lens groups is provided that includes a first cam member that is cam-engaged with a holding member of the first lens group to thereby hold the holding member; a second cam member that is cam-engaged with a holding member of the second lens group to thereby hold the holding member; a third cam member that guides the first and the second cam members; and a supporting member that is cam-engaged with the third cam member to thereby rotatably support the cam member, wherein, with the aid of the first cam member, the third cam member, and the supporting member, the first lens group moves in accordance with the rotation of the third cam member, and with the aid of the second cam member, the third cam member, and the supporting member, the second lens group moves in accordance with the rotation of the third cam member.

According to the present invention, a first lens group and a second lens group are cam-engaged with and held by two separate cam members, respectively, these cam members are guided by a third cam member, and the third cam member is cam-engaged with and supported by the supporting member. With this arrangement, the variation in the relative distance between the respective lens groups is increased.

Further features of the present invention will become apparent from the following description of exemplary embodiments with reference to the attached drawings.

DESCRIPTION OF THE EMBODIMENTS

Figure 1:
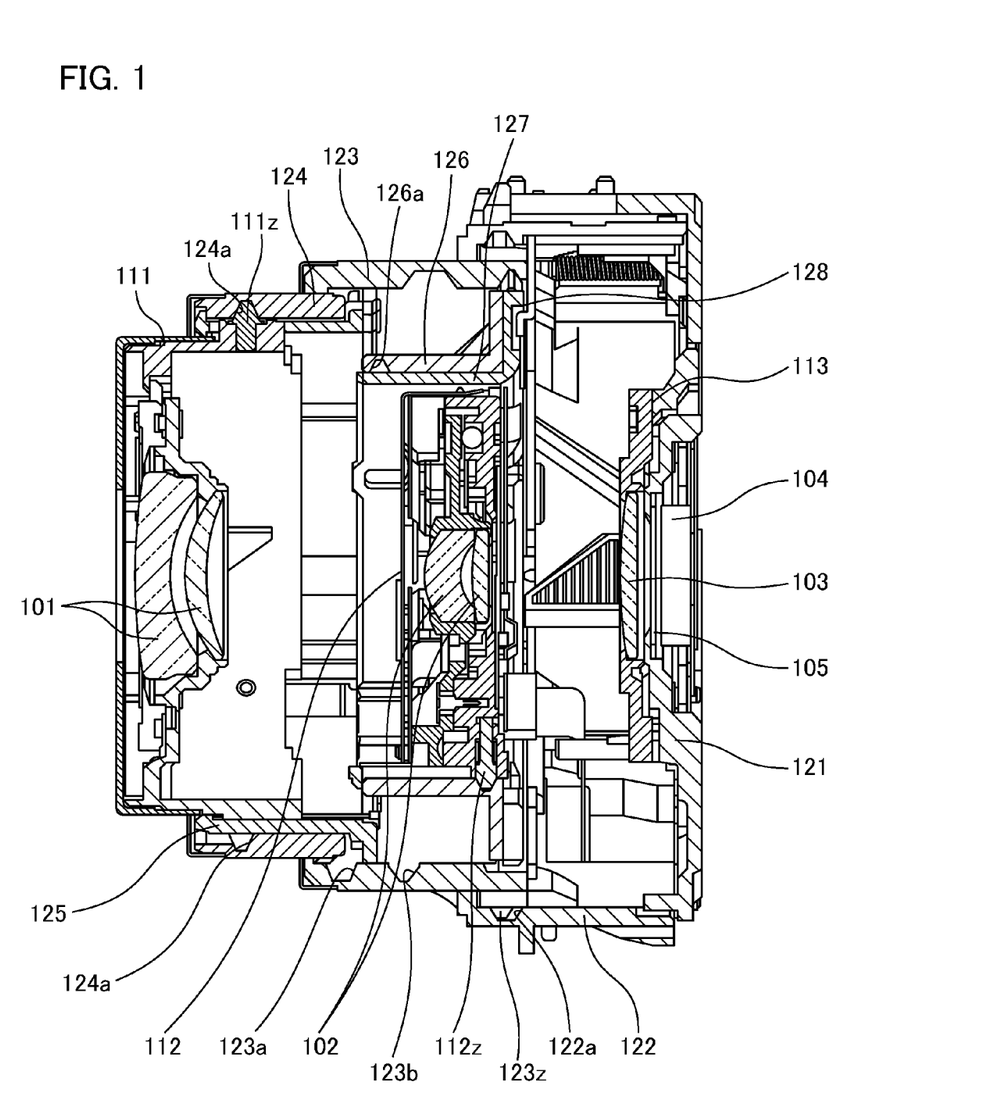
FIG. 1 is a central sectional view illustrating an exemplary configuration of a lens barrel according to one embodiment of the present invention.

Hereinafter, as an embodiment according to the imaging apparatus of the present invention, a description will be given of an exemplary configuration of an apparatus provided with a three-stage retractable lens barrel. FIG. 1 is a central sectional view illustrating the lens barrel that is cut along the optical axis. A schematic description will be given of the configuration of the lens barrel with reference to FIG. 1. An imaging optical system includes a first lens group (hereinafter referred to as "first group") 101, a second lens group (hereinafter referred to as "second group") 102, and a third lens group (hereinafter referred to as "third group") 103. Each lens group is typically configured by a plurality of optical members, and the third group 103 (a single lens in the present example) precedes an imaging element 104. The imaging element 104 converts a subject image formed through the lens groups into an electrical signal, and outputs an imaging signal to a signal processing circuit (not shown). An optical filter 105 is disposed on the front face of the imaging element 104. A first group barrel 111, a second group barrel 112, and a third group barrel 113 are holding members of the first group 101, the second group 102, the third group 103, respectively. Although a lens barrier for lens protection and its driving part are provided on the first group barrel (first holding frame) 111, and a shutter mechanism and a diaphragm mechanism are provided on the second group barrel (second holding frame) 112, detailed descriptions thereof will not be given here. Also, the first group 101 cooperates with the second group 102, both of which mainly have a focal distance adjusting function, and the third group 103 mainly has a focal point adjusting function.

A base 121, which functions as a base for the lens barrel, holds the imaging element 104, and is mounted on a fixed tube 122 that serves as a supporting member. The fixed tube 122 is cylindrical and has a cam groove 122a on the inner periphery thereof. The lens barrel includes a first cam member (a first group cam ring 124), a second cam member (a second group cam ring 126), and a third cam member (a moving cam ring 123). The first group cam ring 124 is cam-engaged with the first group barrel 111 for holding, and the second group cam ring 126 is cam-engaged with the second group barrel 112 for holding. The moving cam ring 123 engages with the first group cam ring 124 and the second group cam ring 126 to thereby guide them. Furthermore, a first restricting member (a first group rectilinear ring 125), a second restricting member (a second group rectilinear ring 127), and a rectilinear guide member (a guide plate 128) that restricts the rotation of the rectilinear rings are provided.

The cylindrical moving cam ring 123 has a cam follower 123z on the outer periphery thereof. The cam follower 123z engages with the cam groove 122a of the fixed tube 122. Two types of cam grooves 123a and 123b are formed on the inner periphery of the moving cam ring 123, and is engaged with the cam followers (not shown) formed on the first group rectilinear ring 125 and the second group rectilinear ring 127. In other words, a cam groove 123a engages with the cam follower provided on the outer periphery of the first group rectilinear ring 125, and a cam groove 123b engages with the cam follower provided on the outer periphery of the second group rectilinear ring 127. The first group rectilinear ring 125 holds the first group cam ring 124, is integrally movable with the first group cam ring 124 in the optical axis direction, and is relatively rotatable in the direction about the optical axis. The cam grooves 124a is formed on the inner periphery of the first group cam ring 124, and is engaged with a cam follower 111z provided on the outer periphery of the first group barrel 111. The second group rectilinear ring 127 holds the second group cam ring 126, is integrally movable with the second group cam ring 126 in the optical axis direction, and is relatively rotatable in the direction about the optical axis. A cam groove 126a is formed on the inner periphery of the second group cam ring 126, and is engaged with a cam follower 112z provided on the outer periphery of the second group barrel 112. The guide plate 128 is a rectilinear guide member of which the rotation is restricted with respect to the fixed tube 122, and restricts the rotation of the first group rectilinear ring 125 and the second group rectilinear ring 127 by means of two keys (rectangular restricting portions in the present example) to be described below.

The lens barrel is a three-stage barrel in which the respective positions of the first group barrel 111 and the second group barrel 112 in the optical axis direction are determined by three cam rings 123, 124, and 126. It should be noted that, in the optical system of the present example, the first group 101 has a negative power, the second group 102 has a positive power, the third group 103 has a positive power, and a change in focal distance is mainly determined by the arrangement of the lenses of the first group and the second group. The lens barrel has the property that the focal distance varies by largely moving the second group 102 in the optical axis direction. In recent years, there is a trend toward the amount of movement of the second group becoming large relative to the overall length of the lens due to a reduction in the overall length of the lens and, as a result of high magnification. The overall length of the lens barrel in the retracted state has conventionally been determined by the amount of movement of the first group. However, in recent years, such a length is largely affected by the amount of movement of the second group.

Figure 2:
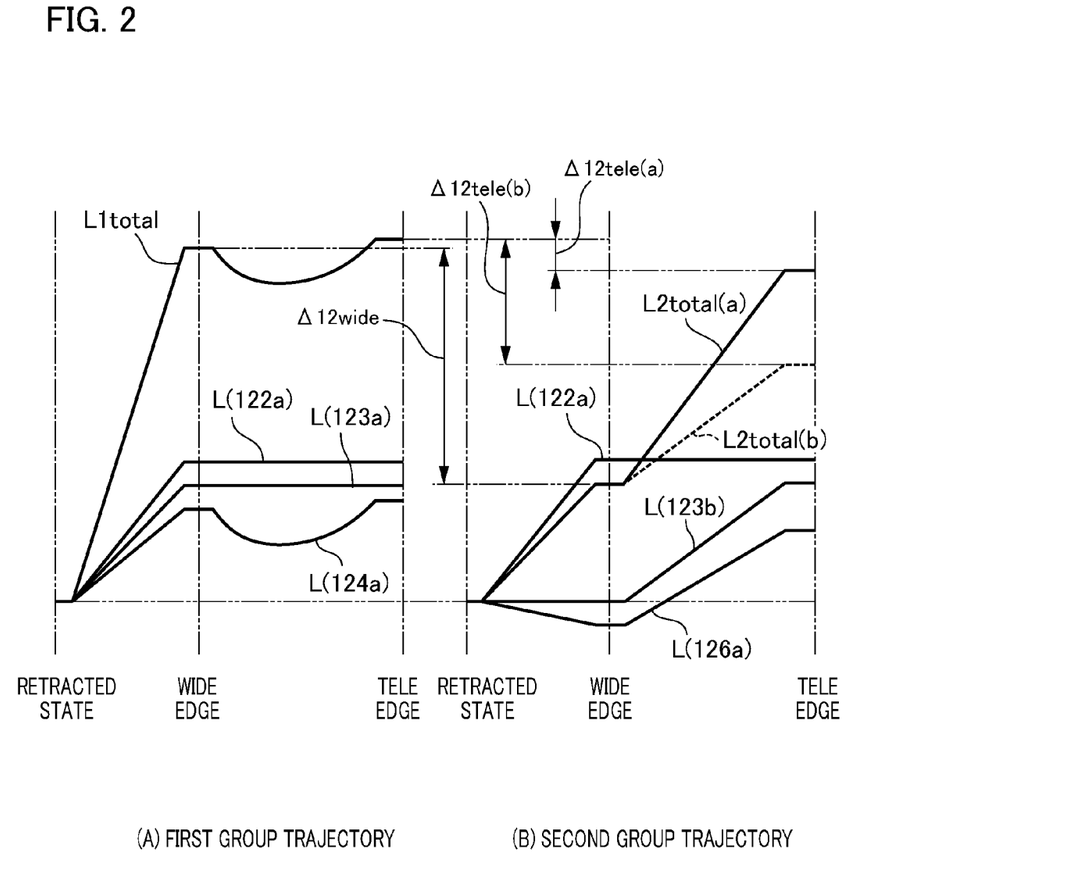
FIG. 2 is a schematic view illustrating the cam trajectory of the lens barrel.

FIG. 2 is a schematic view illustrating the cam trajectories of the lens groups. In the optical system, the first group has a negative power and both the second group and the third group have a positive power. FIG. 2A shows the cam trajectory of the first group 101, and FIG. 2B shows the cam trajectory of the second group lens 102. The upper side of the figure shows a subject side, i.e., the front side of the imaging apparatus. The term "retracted state" refers to a state in which the lens barrel is housed within the camera body while not in operation. The term "wide edge" refers to a wide-angle edge in the variation of the angle of field. The term "tele edge" refers to a telescopic edge in the variation of the angle of field. The reference symbol L (122a) shown in FIG. 2 represents the cam trajectory of the cam groove 122a provided on the inner periphery of the fixed tube 122. L (122a) varies linearly from the retracted state to the front of the wide edge, and is at a predetermined position from the front of the wide edge to the tele edge. A stroke, which is provided by the cam groove 122a and the cam follower 123z engaged thereto, is added to the first group 101 and the second group 102 as a common component at the optical axis direction thereof. In FIG. 2A, the reference symbol L (123a) represents the cam trajectory of the cam groove 123a provided on the inner periphery of the moving cam ring 123. L (123a) varies linearly from the retracted state to the front of the wide edge, and is at a predetermined position from the front of the wide edge to the tele edge. The reference symbol L (124a) represents the cam trajectory of the cam grooves 124a provided on the inner periphery of the first group cam ring 124. L (124a) varies linearly from the retracted state to the front of the wide edge and has a concave curve section between the wide edge and the tele edge. As shown in the combined trajectory (L1 total), the optical axis directional position of the first group 101 is determined by the sum of the positional components of the cam trajectories shown in L (122a), L (123a), and L (124a), and the first group 101 moves in the optical axis direction in accordance with the combined trajectory.

For the second group 102, the reference symbol L (123b) shown in FIG. 2B represents the cam trajectory of the cam groove 123b provided on the inner periphery of the moving cam ring 123. L (123b) is at a predetermined position between the retracted state and the point beyond the wide edge, and has a linear section from the wide edge to the tele edge. The reference symbol L (126a) represents the cam trajectory of the cam groove 126a provided on the inner periphery of the second group cam ring 126. L (126a) has a linear section of negative slope (retracting direction) between the retracted state and the wide edge, and has a linear section between the wide edge and the tele edge. The combined trajectory (L2 total(a)) represents the sum of the positional components of the cam trajectories shown in L (122a), L (123b), and L (126a), i.e., the movement trajectory of the second group 102.

The reference symbol Δ12 wide shown in FIG. 2 represents the spacing (positional difference) between the first group 101 and the second group 102 in the wide edge. The reference symbol Δ12 tele(a) represents the spacing between the first group 101 and the second group 102 in the tele edge. As described, it is required that the amount of movement of the lens groups from the retracted-state position is equal. It is also required that the spacing between the first group 101 and the second group 102 can be varied largely from the Δ12 wide at the wide edge to the Δ12 tele(a) at the tele edge. This purpose is achieved in that the first group barrel 111 has a three-stage cam configuration and the second group barrel 112 has a three-stage cam configuration. For example, in the cam configuration of the second group, a two-stage configuration without the cam trajectory L (123b) is assumed. In this case, the combined trajectory of the second group becomes L2 total(b), which is indicated by a broken line. Consequently, the spacing between the first group and the second group at the tele edge increases from Δ12 tele(a) to Δ12 tele(b), resulting in a deterioration in field angle magnification change.

In the present embodiment, the cam groove 123a for the first group and the cam groove 123b for the second group are separately formed on the moving cam ring 123 that is the second stage from the base 121. In other words, the mutual spacing between the first group 101 and the second group 102 is determined by the difference between the stroke (=L (123a)+L (124a)) of the two cam stages of the first group barrel 111 and the stroke (=L (123b)+L (126a)) of the two cam stages of the second group barrel 112. With this arrangement, the large amount of change in the mutual spacing between the first group and the second group can be obtained even for a lens barrel having a short overall length in the retracted state, whereby a lens barrel suitable for thinning can be realized. For example, when the cam of the first group is separated from the cam of the second group at the third stage from the base, the mutual spacing between the first group and the second group is determined only by the first stage of cam stroke, whereby the mutual spacing cannot be increased.

Figure 3:
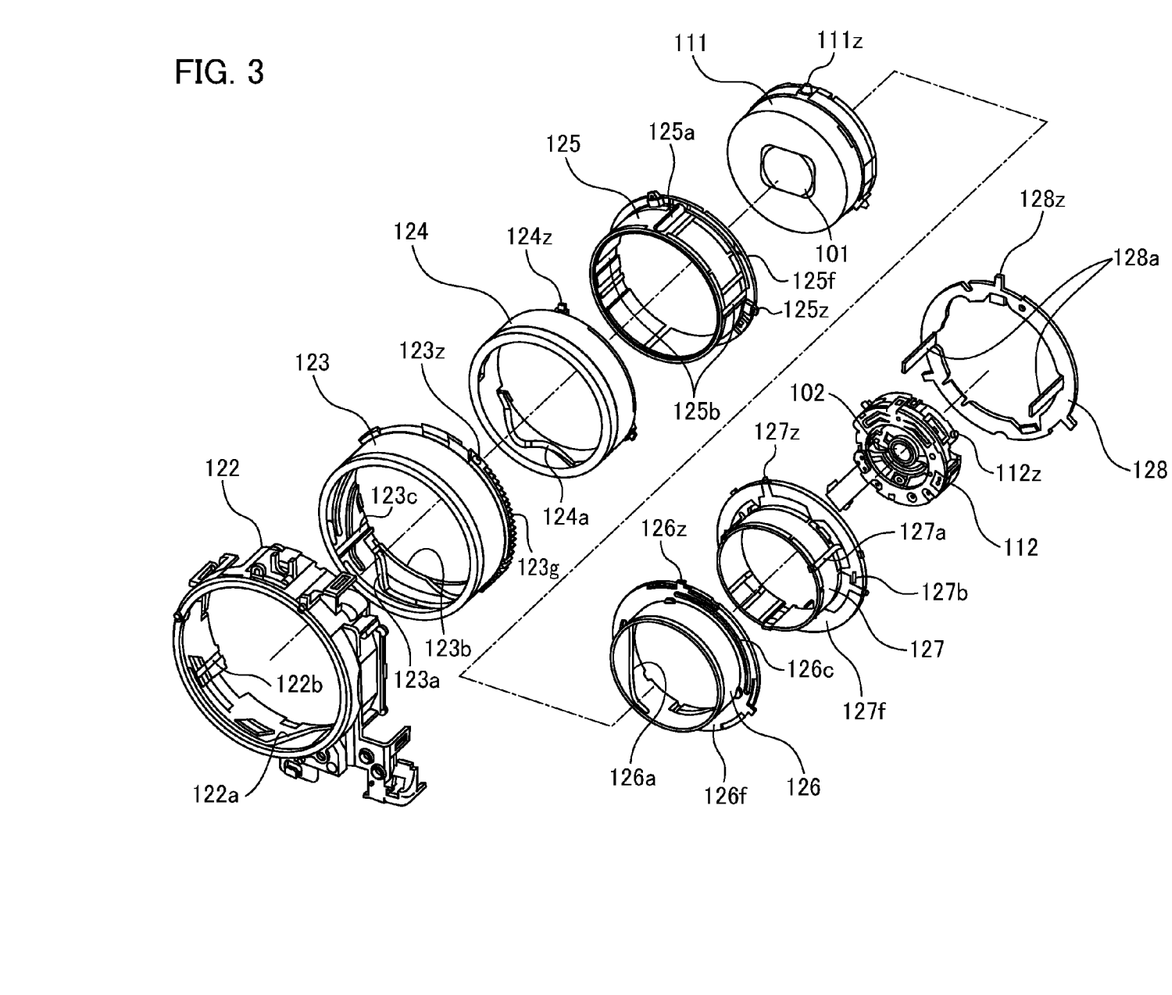
FIG. 3 is an exploded perspective view illustrating an exemplary configuration of the zoom mechanism of the lens barrel.

Next, a detailed description will be given of the configuration of a lens barrel. FIG. 3 is an exploded perspective view illustrating an exemplary configuration of the zoom mechanism of the lens barrel. First, the holding mechanism for the first group 101 will be described. The first group rectilinear ring 125 is fitted into the inner periphery of the first group cam ring 124. Both rings are integrally movable in the optical axis direction with the aid of a slip-off restricting portion (not shown) and are relatively rotatable to each other. Three cam grooves 124a formed on the inner peripheral surface of the first group cam ring 124 are engaged with three cam followers 111z provided on the first group barrel 111 to thereby guide the first group barrel 111 along the cam grooves 124a. Three rectilinear guide grooves 125a are formed on the side surface of the cylindrical portion of the first group rectilinear ring 125 and are engaged with the cam followers 111z provided on the first group barrel 111 to thereby restrict the rotation of the first group barrel 111. The rotation of the first group rectilinear ring 125 itself is restricted by the fact that two keys 128a erected on the guide plate 128 are respectively fit into two slits 125b formed on the side surface of the first group rectilinear ring 125. Note that the keys 128a are positioned opposite to each other sandwiching the optical axis, and extend parallel to the optical axis. Three convex portions 128z, which extend outwardly in the radial direction from the flange portion of the guide plate 128, are formed on the guide plate 128. Three convex portions 128z are respectively fit into three rectilinear guide grooves 122b formed on the inner periphery of the fixed tube 122 to thereby restrict the rotation thereof.

The same principle applies to the holding mechanism for the second group barrel 112 as in the first group barrel 111. The second group rectilinear ring 127 is fitted into the inner periphery of the second group cam ring 126. Both rings are integrally movable in the optical axis direction with the aid of a slip-off restricting portion (not shown) and are relatively rotatable to each other. Three cam grooves 126a formed on the inner peripheral surface of the second group cam ring 126 are engaged with cam followers 112z provided on the second group barrel 112 to thereby guide the second group barrel 112 along the cam grooves 126a. Three rectilinear guide grooves 127a are formed on the side surface of the cylindrical portion of the second group rectilinear ring 127 and three cam followers 112z provided on the second group barrel 112 are respectively fit into three guide grooves 127a to thereby restrict the rotation of the second group barrel 112. A flange portion 127f, which extends outwardly in the radial direction from the cylindrical portion of the second group rectilinear ring 127, is formed on the second group rectilinear ring 127, and is provided with two slit holes 127b. The keys 128a provided on the guide plate 128 are respectively passed through the slit holes 127b of the flange portion 127f to thereby restrict the rotation of the second group rectilinear ring 127. A flange portion 126f, which extends outwardly in the radial direction from the cylindrical portion of the second group rectilinear ring 126, is formed on the second group rectilinear ring 126. The keys 128a are respectively passed through two arcuate holes 126c provided in the flange portion 126f.

Next, a description will be given of the engagement relationship between the cam groove and the cam follower. A first cam follower 125z formed on the first group rectilinear ring 125 engages with a first cam groove 123a formed on the inner periphery of the moving cam ring 123. A second cam follower 127z formed on the second group rectilinear ring 127 engages with a second cam groove 123b formed on the inner periphery of the moving cam ring 123. With this arrangement, the first group rectilinear ring 125 and the second group rectilinear ring 127 are guided along the cam grooves 123a and 123b, respectively. Three rectilinear guide grooves 123c are formed on the inner periphery of the moving cam ring 123 in the circumferential direction. These rectilinear guide grooves 123c are fit onto a projection 124z on the outer periphery of the first group cam ring 124 and a projection 126z on the outer periphery of the second group cam ring 126, respectively, and the first group cam ring 124 and the second group cam ring 126 rotate following the moving cam ring 123. The moving cam ring 123 is guided along three cam grooves 122a on the inner periphery of the fixed tube 122. In other words, the cam follower 123z engages with the corresponding cam grooves 122a. A gear section 123g is integrally formed on the outer periphery of the moving cam ring 123. A force generated by a drive motor is transmitted to the gear section via a drive gear to be described below, and the moving cam ring 123 rotates around the optical axis as well as moves in the optical axis direction. The guide plate 128 is integrally movable with the moving cam ring 123 in the optical axis direction with the aid of a slip-off restricting portion (not shown) provided on the moving cam ring 123, and is relatively rotatable in the direction about the optical axis.

In the present structure, the first group cam ring 124 also rotates following the rotation of the moving cam ring 123. Since the rotation of the first group rectilinear ring 125 is restricted by the keys 128a on the guide plate 128, the first group barrel 111 only moves in the optical axis direction. Note that the first group rectilinear ring 125 has a flange portion 125f extending in the radial direction at the rear end portion thereof, and provides an effect of improving the strength and the light-shielding property of the barrel as described below.

On the other hand, the second group cam ring 126 also rotates following the rotation of the moving cam ring 123. Since rotation of the second group rectilinear ring 127 is restricted by the keys 128a on the guide plate 128, the second group barrel 112 only moves in the optical axis direction. Note that the second group cam ring 126 and the second group rectilinear ring 127 respectively have flange portions 126f and 127f extending in the radial direction at the rear end portion thereof, and provide an effect of improving the strength and the light-shielding property of the barrel as described below.

Figure 4:
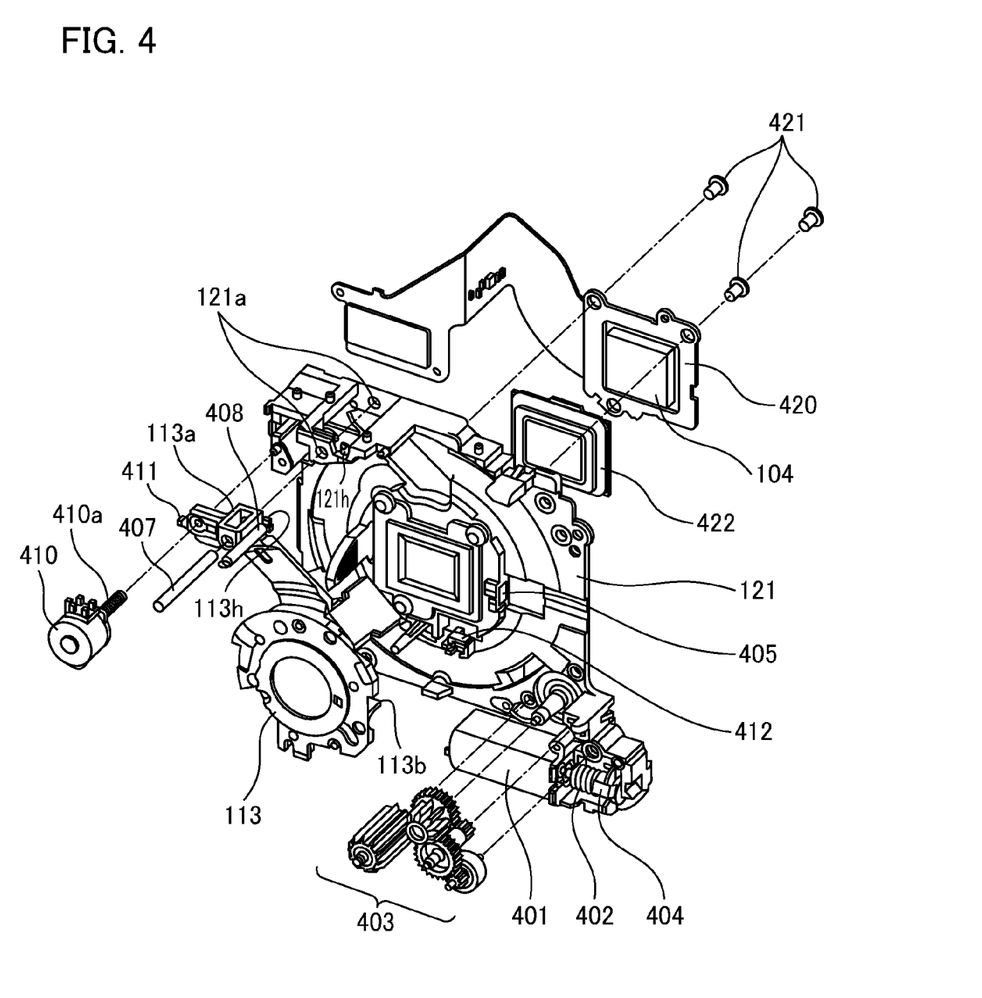
FIG. 4 is an exploded perspective view illustrating an exemplary configuration of the peripheral portion of the zoom mechanism driving system, the focus driving system, and the imaging element of the lens barrel.

FIG. 4 is an exploded perspective view illustrating the peripheral portion of the zoom mechanism driving system, the focus driving system, and the imaging element of the lens barrel. A zoom motor 401 is attached beneath the base 121 as the drive source for the zoom mechanism. A gear 402 is fixed onto the rotary shaft of the zoom motor 401, a transmission gear group 403 transmits the rotational force of the gear 402 to the gear section 123g formed on the moving cam ring 123. A photo interrupter 404 provided adjacent to the gear 402 detects the rotational direction and rotational frequency of the zoom motor 401. A photo interrupter 405 provided on the base 121 detects a reset position during zoom driving. A light-shielding rib (not shown) provided on the second group rectilinear ring 127 shields the photo interrupter 405 from light to thereby perform reset detection.

A sleeve 113a extends from the third group barrel 113. The guide bar 407 is held by the holding section 121a of the base 121 with a guide bar 407 inserted through the sleeve 113a, and thus the sleeve 113a is supported by the base 121. With this arrangement, the third group barrel 113 is advanceable and retractable along the guide bar 407 in a direction parallel to the optical axis. One end of an offset spring 408 is hooked onto a hook 113h provided on a part of the third group barrel 113, and the other end thereof is hooked onto a hook 121h provided on the holding section 121a of the base 121. A focus motor 410 as the drive source for the focus driving mechanism constitutes a feed screw mechanism for driving the third group barrel 113. With the aid of a rotary shaft 410a, i.e., the feed screw of the focus motor 410 and a feed nut 411 provided on the third group barrel 113, the third group barrel 113 advances and retracts along the guide bar 407 in a direction parallel to the optical axis. A rib 113b is provided on the third group barrel 113. When a photo interrupter 412 provided on the base 121 is shielded against light, the reset position of the third group barrel 113 during focus driving is detected by the rib 113b. The imaging element 104 is fixed to a holding plate 420, and is mounted to the base 121 using a plurality of screws 421. A rubber member 422 for dust protection is held sandwiched between the holding plate 420 and the optical filter 105 (not shown).

According to the present embodiment, the holding frame of the first group 101 is cam-engaged with and held by the first group cam ring 124, and the holding frame of the second group 102 is cam-engaged with and held by the second group cam ring 126. Then, these members are engaged with and held by the second-stage moving cam ring 123 to serve as a guide, whereby variation in the relative distance between the first group and the second group can be increased.

Figure 5:
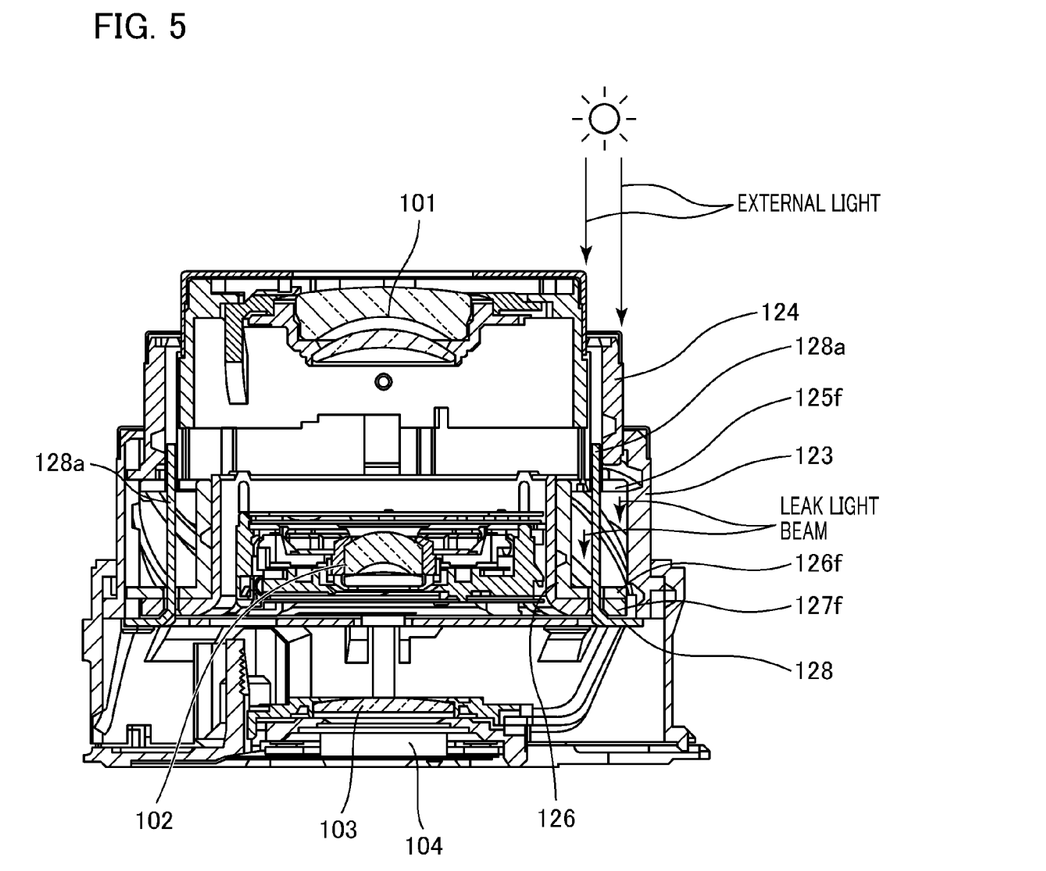
FIG. 5 is a central sectional view illustrating the configuration of the lens barrel in order to explain the light-shielding effect and the strength enhancing effect.

FIG. 5 is a sectional view illustrating the lens barrel, which includes two keys 128a of the guide plate 128, in the wide edge state with the section plane being along the optical axis. Hereinafter, a description will be given of an effect of an improvement in the light-shielding property and strength of the barrel configuration with reference to FIG. 5.

A slight clearance remains in the radial direction between the moving cam ring 123 and the first group cam ring 124. When light emitted from a strong light source such as sunlight passes through the clearance and reaches the inside of the barrel, there is a possibility that such light may affect a shot image. Hence, the flange portion 125f, a part of which extends outwardly in the radial direction, is formed on the first group rectilinear ring 125. Light that has penetrated into the barrel can be shielded by using the fact that the outer diameter of the flange portion 125f and the inner diameter of the moving cam ring 123 are made substantially equal. In other words, when light passes through the clearance between the outer periphery of the first group cam ring 124 and the inner periphery of the moving cam ring 123, the intensity of impinging light is attenuates by repeated surface reflection. Thereafter, when light passes through the clearance between the flange portion 125f and the inner peripheral surface of the moving cam ring 123, surface reflection is further repeated, and thus the attenuation effect is further increased. While in the present embodiment, the flange portion 125f is formed on the first group rectilinear ring 125, a similar flange portion may be formed on the first group cam ring 124 instead of or in conjunction with the flange portion 125f. The flange portion extends in a direction perpendicular to the optical axis of the lens group and spans the inner peripheral surface of the moving cam ring 123. If the flange portion is constituted such that the key 128a passes therethrough, the light attenuation effect is obtained.

Likewise, the outer diameter of each of the flange portion 126f of the second group cam ring 126 and the flange portion 127f of the second group rectilinear ring 127 is substantially equal to the inner diameter of the moving cam ring 123. With this arrangement, the aforementioned attenuated light is further attenuated by the clearance between the flange portions 126f and 127f and the inner peripheral surface of the moving cam ring 123. Since the guide plate 128 is mounted to the rear end surface of the moving cam ring 123, the attenuated light described above is finally shielded by the guide plate 128.

Consequently, external light is attenuated to such an extent which does not affect a shot image.

When the lens barrel is in a retracted state, the second group cam ring 126 and the second group rectilinear ring 127 are housed within the inside of the radial direction perpendicular to the optical axis with respect to the first group barrel 111, the first group cam ring 124, and the first group rectilinear ring 125. Hence, even if external light is incident from the clearance between the first group barrel 111 and the first group rectilinear ring 125, such light can be shielded by the flange portions 126f and 127f. In the present example, the lens barrel employs the configuration in which the keys 128a of the guide plate 128 are inserted through the slit holes 127b formed on the flange portion 127f and the arcuate holes 126c formed on the flange portion 126f. With this arrangement, the respective flange portion is present outside the key 128a in the radial direction, resulting in increasing the light-shielding effect.

As described above, if the lens barrel is configured such that a flange portion, of which the outer diameter is substantially equal to the inner diameter of the moving cam ring 123, is provided and a rectilinear key is passed through the flange portion, a structure such that light does not readily pass through can be realized.

Figure 6:
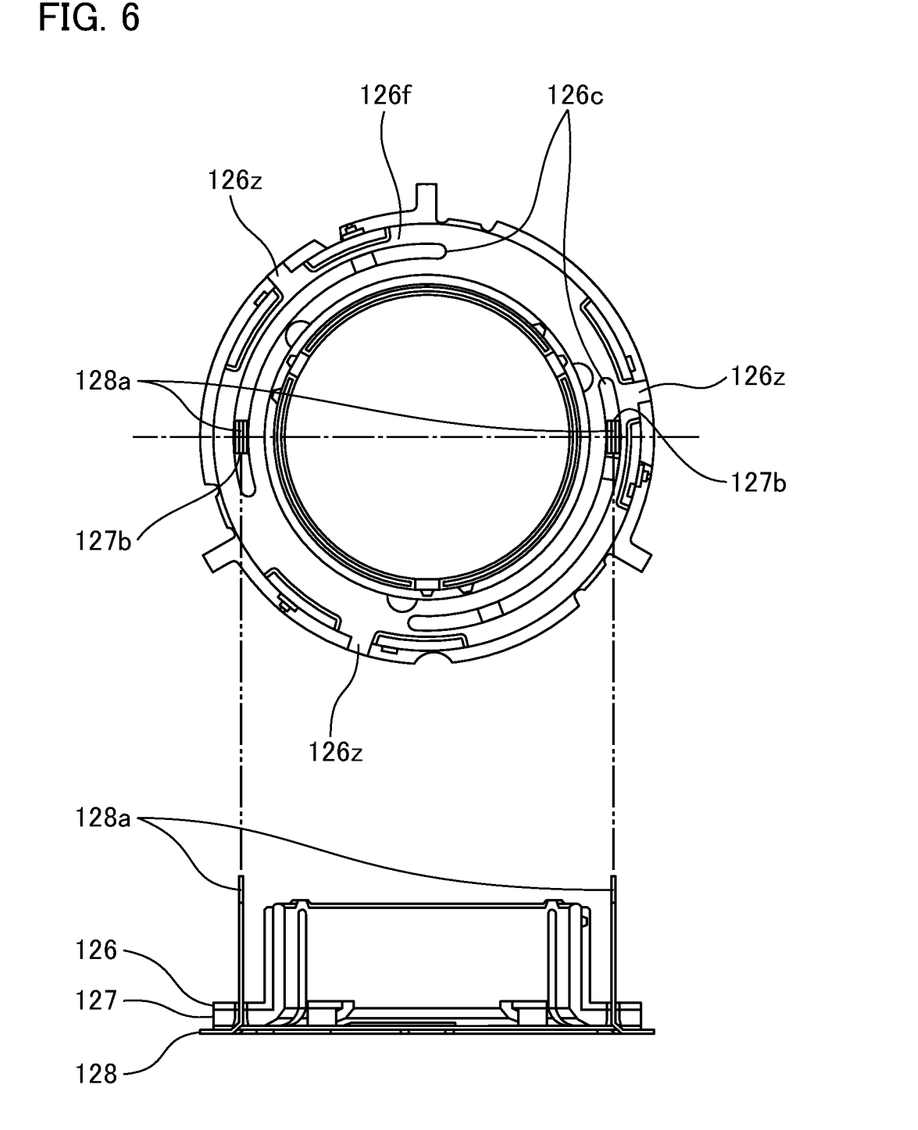
FIG. 6 is a front view and a central sectional view illustrating the positions of a second group cam ring 126, a second group rectilinear ring 127, and a guide plate 128 at the wide edge thereof in order to explain the configuration for the enhancement of the degree of freedom of design.

The presence of a flange portion outside the key 128a also provides an effect of increasing the degree of freedom of design layout. This is because the projection 126z formed on the second group cam ring 126 can be located at any position in the entire periphery of the flange portion. Consequently, by providing an interlocking section between adjacent members at the flange portion, the position of the interlocking section is not limited thereby. FIG. 6 is a front view and a central sectional view illustrating the relationship among the second group cam ring 126, the second group rectilinear ring 127, and the guide plate 128 at the wide edge thereof. The rotation of the second group rectilinear ring 127 is restricted because two keys 128a are inserted and connected to two slit holes 127b formed on the second group rectilinear ring 127. The arcuate slit holes 126c located facing the center of the optical axis are formed on the second group cam ring 126 so as to avoid the keys 128a. Two keys 128a are formed on the guide plate 128 so as to face to each other, and thus are also disposed at positions opposing the slit holes 126c. In the second group cam ring 126 that rotates following the moving cam ring 123, the positional relationship between three projections 126z formed in the circumferential direction and the slit holes 126c becomes irregular. For example, as shown in FIG. 6, the upper-left projection 126z is positioned outside of the slit hole 126c. If the second group cam ring 126 is made into a simple shape in which there is no shape part outside the slit hole 126c, there would be no way other than disposing the projection 126z between two slit holes 126c in the circumferential direction. When a flange portion is provided outside the key 128a, such a restriction is not applied. In the present embodiment, three projections 126z are provided in the circumferential direction about the optical axis, and the reason for this is that the degree of freedom of design layout is taken into consideration. In other words, as described above, the projection 126z is fit into a linear groove 123c (see FIG. 3) formed on the inner periphery of the moving cam ring 123, and two types of cam grooves 123a and 123b are respectively provided on the inner periphery thereof at three positions in the circumferential direction. In order to dispose the linear groove 123c while avoiding these cam grooves, it is desirable that three linear groove 123c also be disposed in the circumferential direction. In this manner, a shape part remains present outside the slit holes 126c of the second group cam ring 126, resulting in an increased efficiency in the degree of freedom of design layout. Note that the aforementioned description is also applicable to the case where a flange portion is formed on the first group cam ring 124 to dispose the projection 124z on the outer periphery thereof.

Figure 7A:
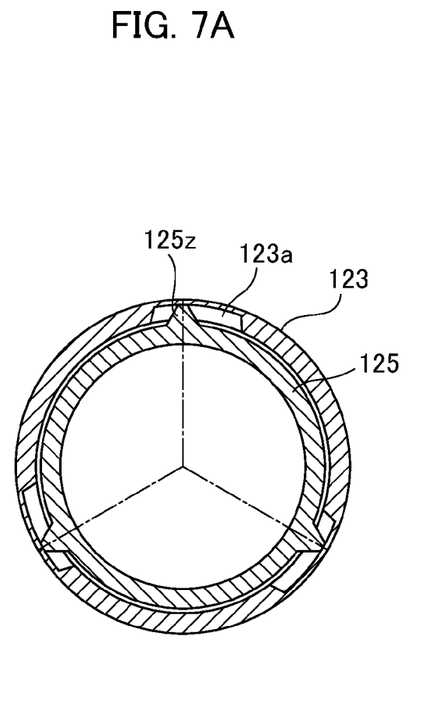
FIG. 7A is a cross-sectional view illustrating the essential parts of a moving cam ring 123 and a first group rectilinear ring 125 in order to explain the improvement effect of the barrel strength by a flange portion.
Figure 7B:
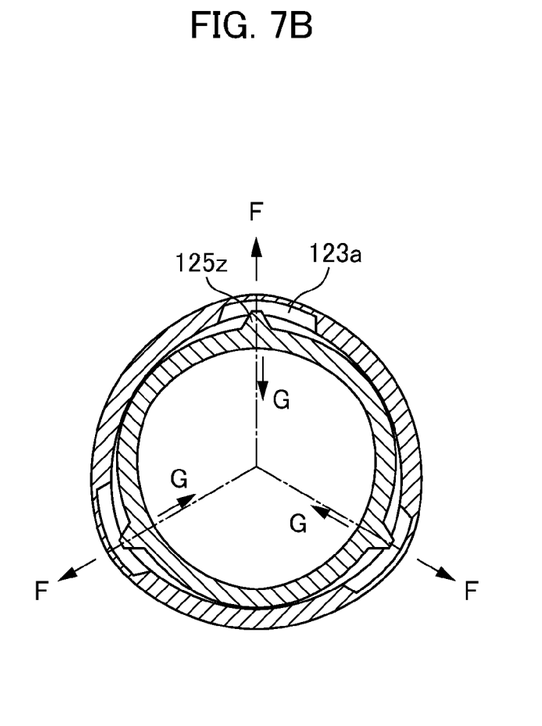
FIG. 7B is another cross-sectional view illustrating the essential parts of a moving cam ring 123 and a first group rectilinear ring 125 in order to explain the improvement effect of the barrel strength by a flange portion.

Next, the effect of the barrel strength that is improved by a flange portion will be described with reference to FIG. 7. FIG. 7A is a schematic sectional view of the moving cam ring 123 and the first group rectilinear ring 125 sectioned at the face passing through the cam follower 125z. In a normal state of use, as shown in FIG. 7A, the cam follower 125z is securely fit into the cam groove 123a. FIG. 7B is an exaggerated diagram illustrating a state where an excessive external force is applied from the front to the leading end of the barrel when a camera drops and the barrel falls on the ground from the leading end thereof. Since the cam follower 125z and the cam groove 123a have a tapered abutment surface as shown in the cross-section in FIG. 1 to thereby have a slope in the optical axis direction, both of them tend to mutually slide along the slope by the external force applied from the front. As shown in FIG. 7B, the portion, which is fit into the cam follower 125z, of the moving cam ring 123 is temporarily deformed to thereby be swollen outwardly (see the arrow F), and the cam follower 125z of the first group rectilinear ring 125 is deformed to be deflected inwardly (see the arrow G). The arrows F and G denote the direction of deformation. When such deformation becomes large, the cam follower 125z falls out from the cam groove 123a, which possibly makes the barrel incapable of performing normal operation. Thus, in the present embodiment, by providing the flange portion 125f on the first group rectilinear ring 125, the barrel employs a less deformable shape with an increased rigidity compared to that of a simple cylindrical shape. Also, as shown in FIG. 7B, in the first group rectilinear ring 125, the cam follower 125z is deflected inwardly while a portion, which is positioned between the cam followers 125z, synchronously swells outwardly. The outwardly-swollen flange portion 125f abuts the inner peripheral surface of the moving cam ring 123, whereby further deformation is suppressed. Consequently, the effect that the cam follower 125z does not readily fall out from the cam groove 123a is obtained.

Furthermore, the second group cam ring 126 and the second group rectilinear ring 127 are engaged with the moving cam ring 123 as described above, the flange portions 126f and 127f thereof abut the inwardly-deflected inner peripheral surface of the moving cam ring 123. With this arrangement, deformation of the moving cam ring 123 is suppressed, and the first group rectilinear ring 125 does not readily fall out.

As described above, the guide plate 128 regulates both of the first group rectilinear ring 125 and the second group rectilinear ring 127 using the common keys 128a. Hence, an effect which reduces positional shift of the first group rectilinear ring 125 and the second group rectilinear ring 127 in their rotational direction is obtained. Use of two types of keys (restricting portion) for first group restriction and second group restriction as in the conventional way, each with two keys, becomes no longer necessary, resulting in a reduction in the number of keys. Consequently, an effect of improving processability and cost reduction is obtained. Using the key for each group is disadvantageous for ensuring operation accuracy. Thus, as in the present embodiment, using one type of key for the restriction of both groups is effective.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-024664 filed Feb. 5, 2010, and Japanese Patent Application No. 2010-024665 filed Feb. 5, 2010 which are hereby incorporated by reference herein in its entirety.

What is claimed is:

1. A lens barrel comprising a first lens group and a second lens group that are movable in an optical axis direction and a driving mechanism of the lens groups, the lens barrel comprising:
a first cam member that is cam-engaged with a first holding member of the first lens group to thereby hold the first holding member;
a second cam member that is cam-engaged with a second holding member of the second lens group to thereby hold the second holding member;
a third cam member that guides the first and the second cam members; and
a supporting member that is cam-engaged with the third cam member to thereby rotatably support the third cam member,
wherein, the first lens group moves in accordance with the rotation of the third cam member, the second lens group moves in accordance with the rotation of the third cam member,
wherein the lens barrel further comprises:
a first rectilinear ring that is integrally movable with the first cam member in the optical axis direction and is relatively rotatable with respect to the first cam member about the optical axis;
a second rectilinear ring that is integrally movable with the second cam member in the optical axis direction and is relatively rotatable with respect to the second cam member about the optical axis;
the third cam member that guides the first and the second rectilinear rings; and
a rectilinear guide member that is integrally movable with the third cam member in the optical axis direction and restricts the rotation of the first and the second rectilinear rings;
a first cam follower that is formed on the first rectilinear ring;
a second cam follower that is formed on the second rectilinear ring; and
a first projection that is formed on the first cam member; and
a second projection that is formed on the second cam member,
wherein the third cam member comprises a first cam groove that engages with the first cam follower, a second cam groove that engages with the second cam follower, and a first guide groove that engages with the first projection, and a second guide groove that engages with the second projection.

2. The lens barrel according to claim 1, wherein the second cam member and the second rectilinear ring are housed within the inside of the radial direction perpendicular to the optical axis with respect to the first holding frame, the first cam member, and the first rectilinear ring when the lens barrel is in a retracted state.

3. The lens barrel according to claim 1, further comprising:
a restricting portion that extends from the rectilinear guide member in the optical axis direction; and
a hole that is formed on each of the second cam member and the second rectilinear ring,
wherein the restricting portion passed through the hole fits into a slit formed in the first rectilinear ring.

4. An imaging apparatus comprising:
the lens barrel according to claim 1; and
an imaging element that converts a subject image formed through the lens barrel into an electrical signal.

5. A lens barrel comprising a first lens group and a second lens group that are movable in an optical axis direction, the lens barrel comprising:
a first cam member that is cam-engaged with a first holding member of the first lens group to thereby hold the first holding member;
a first restricting member that restricts the rotation of the first holding member of the first lens group;
a second cam member that is cam-engaged with a second holding member of the second lens group to thereby hold the second holding member;
a third cam member that guides the first and the second cam members; and
a rectilinear guide member that is integrally movable with the third cam member in the optical axis direction and has a first restricting portion that restricts the rotation of the first restricting member;
wherein a first flange portion, which extends in a direction perpendicular to the optical axis of the lens group over the inner peripheral surface of the third cam member, is formed on the first cam member or the first restricting member, and the first restricting portion penetrates through the first flange portion,
wherein the lens barrel further comprises a second restricting portion that restricts the rotation of the second holding member of the second lens group,
wherein a second flange portion, which extends in a direction perpendicular to the optical axis of the lens group over the inner peripheral surface of the third cam member, is formed on the second cam member or the second restricting member, and the second restricting portion penetrates through the second flange portion, and
wherein a projection, which rotates following the third cam member, is placed around the outer periphery of the flange portion of the second cam member, and a guide groove, which engages with the projection, is formed on the third cam member.

6. The lens barrel according to claim 5, wherein the restricting portion restricts the rotation of the first and the second restricting members.

7. The lens barrel according to claim 5, wherein the second cam member and the second restricting member are housed within the inside of the radial direction perpendicular to the optical axis with respect to the holding member of the first lens group, the first cam member, and the first restricting member when the lens barrel is in a retracted state.

8. An imaging apparatus comprising:
the lens barrel according to claim 5; and
an imaging element that converts a subject image formed through the lens barrel into an electrical signal.

* * * * *